No. 886,504. PATENTED MAY 5, 1908.
W. B. HILTON.
HARNESS.
APPLICATION FILED AUG. 26, 1907.
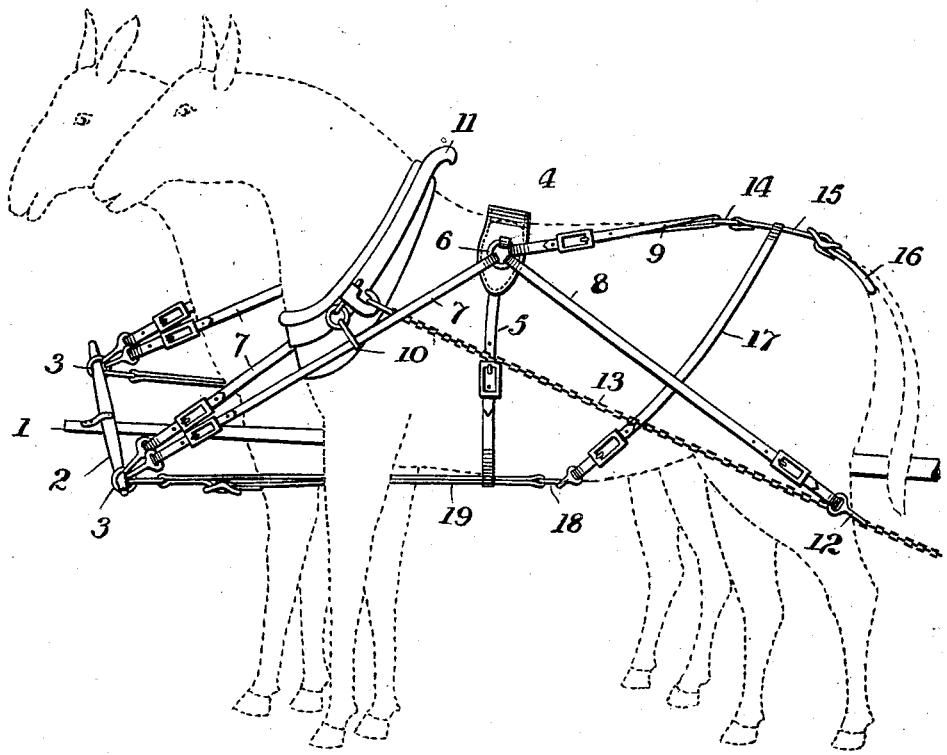

UNITED STATES PATENT OFFICE.

WILLIAM B. HILTON, OF ATLANTA, GEORGIA.

HARNESS.

No. 886,504. Specification of Letters Patent. Patented May 5, 1908.

Application filed August 26, 1907. Serial No. 390,220.

*To all whom it may concern:*

Be it known that I, WILLIAM B. HILTON, a citizen of the United States, and residing at Atlanta, Fulton county, Georgia, have invented certain new and useful Improvements in Harness, of which the following is a specification.

My invention relates to harness adapted to be used upon a team attached to a vehicle provided with a tongue. As is well known, the end of the tongue is ordinarily connected to the collars of the animals by means of a neck yoke and breast straps, and it is also common to have a connection between the collars or breast straps, and the breeching around the hind legs of the animals, so that the animals may guide the vehicle and may hold it back when going down hill. In this old construction the strain on the horses is on the neck and hind legs. Constructions have also been proposed in which part of the strain is on the animal's back through the ordinary saddle.

The object of the present invention is to change the point at which the strain is applied, and to provide means by which the principal strain in holding back is across the hips and withers of the animals, and in which there is no strain on the neck or hind legs.

Another object of the invention is to provide means to shift a part of the strain in pulling the vehicle from the collar to the back of the animal.

The invention consists in so constructing and arranging the straps of the harness that the main strain in holding back is about equally divided between the hips and the withers, and in which a part of the strain in pulling is on the back.

It also consists in the details of construction hereinafter pointed out.

The drawing shows my improved harness in actual use upon the animals, and while it shows only one side of the harness it is to be understood that the parts on the other side of the animal are the same as those which are seen.

In the drawing 1 represents the tongue of any article or machine to which the animals are to be attached. This tongue has the ordinary neck yoke 2 attached to its end, and the harness is attached to this neck yoke by means of the rings 3. My harness includes the ordinary saddle 4, held in place by the strap 5 extending around the animal. On each side of the saddle 4 there is pivoted a ring 6 to which is attached the straps 7, 8 and 9. The strap 7 extends forwardly through a link 10 loosely connected to the hames 11, and is connected at its forward end to the ring 3. The strap 8 extends rearwardly and is connected by a snap hook 12 to the ordinary trace chain 13. The strap 9 also extends rearwardly and is connected to a ring 14 at the forward end of the short back strap 15, which back strap is in turn connected to the crupper 16. Midway of the back strap and over the hips of the animal are connected the cross straps 17 which extend around the animal on each side and are connected to a ring 18 of strap 19, which extends forwardly beneath the animal and is connected to the ring 3.

It is believed that the functions and advantages of the arrangement will be obvious from the above description and from an inspection of the drawing.

It will be noted that the pull in holding back is not upon the collar of the animal, but is sustained by the straps 7 and 19, thus making the back and hips of the animal sustain the strain. It is to be noted furthermore that by reason of the angle of the straps 7 and 9 very little strain will be placed upon the forward part of the animal's body, and that most of it will, through straps 9 and 17, be upon the hips and withers. The straps 8 being connected to the trace chains will take up part of the strain in pulling the vehicle forward, and will thus relieve to a certain extent the strain upon the collar.

It will be noted that the straps 7 extend in such position across the shoulder of the animal that he can easily guide the vehicle by pressing the strap sidewise by means of his shoulder, and thus the twisting action upon his neck which follows from breast straps attached to the collar is avoided. By the use of my invention the neck and legs of the animal are perfectly free from the strains due to guiding and holding back the vehicle and those strains are placed upon the strongest portions of the animal.

What I claim is:

1. In a harness, the combination with a saddle, of a strap attached to each side thereof extending forwardly and adapted to be connected to the neck yoke, a second strap attached to each side of said saddle and extending rearwardly, a short back strap attached to the crupper, the said rearwardly extending strap being attached to this back strap, cross straps attached to the back strap near the crupper and adapted to extend around the horse on opposite sides, and a longitudinal strap adapted to lie beneath the animal and to be connected at its forward end to the neck yoke and at its rear to the ends of the cross straps.

2. In a harness, the combination with a saddle, of a strap attached to each side thereof extending forwardly and adapted to be connected to the neck yoke, a second strap attached to each side of said saddle and extending rearwardly, a short back strap attached to the crupper, the said rearwardly extending strap being attached to this back strap, and a third strap attached to each side of the saddle and adapted to extend rearwardly and be connected to the trace chain.

3. In a harness, the combination with a saddle, of a strap attached to each side thereof extending forwardly and adapted to be connected to the neck yoke, and an additional strap attached to each side of the saddle, extending rearwardly and adapted to be connected to the trace chain.

In testimony whereof I affix my signature in presence of two witnesses.

WILLIAM B. HILTON.

Witnesses:
   MONTFORT J. BRADLEY,
   H. J. SIMONTON.